(12) United States Patent
Kumar Goel

(10) Patent No.: US 10,339,555 B2
(45) Date of Patent: Jul. 2, 2019

(54) INTERACTIVE LOYALTY PROGRAM UTILIZING DYNAMIC LOYALTY POINT CONVERSION

(71) Applicant: Accenture Global Services Limited, Dublin (IE)

(72) Inventor: Puneet Kumar Goel, Bangalore (IN)

(73) Assignee: Accenture Global Services Limited, Dublin (IE)

( * ) Notice: Subject to any disclaimer, the term of this patent is extended or adjusted under 35 U.S.C. 154(b) by 776 days.

(21) Appl. No.: 14/614,711

(22) Filed: Feb. 5, 2015

(65) Prior Publication Data
US 2016/0189197 A1 Jun. 30, 2016

(30) Foreign Application Priority Data
Dec. 24, 2014 (IN) .............................. 6519/CHE/2014

(51) Int. Cl.
*G06Q 30/02* (2012.01)

(52) U.S. Cl.
CPC ................................ *G06Q 30/0233* (2013.01)

(58) Field of Classification Search
CPC ................................................ G06Q 30/0233
USPC .................. 705/14.33, 27.2, 75, 35; 463/29; 235/380
See application file for complete search history.

(56) References Cited

U.S. PATENT DOCUMENTS

| | | | |
|---|---|---|---|
| 8,423,402 B2 * | 4/2013 | Postrel | G06Q 20/06 705/14.33 |
| 8,668,146 B1 | 3/2014 | McGhie et al. | |
| 2005/0054439 A1 * | 3/2005 | Rowe | G06Q 20/3433 463/29 |
| 2006/0027647 A1 * | 2/2006 | Deane | G06K 19/08 235/380 |
| 2008/0027844 A1 * | 1/2008 | Little | G06Q 40/00 705/35 |
| 2010/0125524 A1 * | 5/2010 | Liang | G06Q 20/02 705/75 |

(Continued)

FOREIGN PATENT DOCUMENTS

| | | | | |
|---|---|---|---|---|
| WO | WO-2011136673 A2 * | 11/2011 | | G06Q 30/02 |
| WO | 2014/075144 | 5/2014 | | |
| WO | 2014/078794 | 5/2014 | | |

OTHER PUBLICATIONS

Your Loyalty Program is betraying you (Joseph C. Nunes) (Year: 2006).*

*Primary Examiner* — Tarek Elchanti
(74) *Attorney, Agent, or Firm* — Harrity & Harrity, LLP

(57) ABSTRACT

A system is configured to determine a conversion rate associated with a loyalty program offered by a merchant. The conversion rate may specify a monetary value allotted to a loyalty point in the loyalty program. The conversion rate, associated with the loyalty program, may change over time. The conversion rate may be determined without user input specifying the conversion rate. The system is configured to receive an instruction to lock the conversion rate for a period of time; lock the conversion rate as a locked conversion rate for the period of time based on the instruction; and permit the locked conversion rate to be used to apply a discount to a purchase during the period of time. The locked conversion rate at a time of the purchase may be different from the conversion rate offered by the loyalty program at the time of the purchase.

20 Claims, 12 Drawing Sheets

(56) References Cited

U.S. PATENT DOCUMENTS

| | | | |
|---|---|---|---|
| 2013/0103484 A1* | 4/2013 | McLaughlin | G06Q 30/0226 |
| | | | 705/14.33 |
| 2014/0100996 A1* | 4/2014 | Klein | G06Q 30/0643 |
| | | | 705/27.2 |
| 2014/0143055 A1 | 5/2014 | Johnson | |
| 2014/0188589 A1 | 7/2014 | Call et al. | |
| 2014/0189759 A1 | 7/2014 | Warrick et al. | |
| 2014/0195324 A1 | 7/2014 | Hage | |

* cited by examiner

INTERACTIVE LOYALTY PROGRAM UTILIZING DYNAMIC LOYALTY POINT CONVERSION

RELATED APPLICATION

This application claims priority under 35 U.S.C. § 119 to Indian Non-provisional Patent Application No. 6519/CHE/2014, filed on Dec. 24, 2014, the content of which is incorporated by reference herein in its entirety.

BACKGROUND

Loyalty programs are structured marketing efforts that reward and, therefore, encourage loyal buying behavior. Loyalty program members are typically entitled to either a discount on the current purchase or an allotment of loyalty points that can be used for future purchases.

SUMMARY

According to some implementations, a system may include one or more devices. The one or more devices may receive merchant information regarding a merchant and/or competitor information regarding a competitor of the merchant, and may determine, based on the merchant information and/or the competitor information, a conversion rate associated with a loyalty program offered by the merchant. The conversion rate may specify a monetary value allotted to a loyalty point in the loyalty program. The conversion rate, associated with the loyalty program, may change over time. The one or more devices may receive an instruction to lock the conversion rate for a period of time, may lock the conversion rate as a locked conversion rate for the period of time based on the instruction, and may use the locked conversion rate to apply a discount to a purchase during the period of time. The locked conversion rate at a time of the purchase may be different from the conversion rate offered by the loyalty program at the time of the purchase.

According to some implementations, a computer-readable medium may store instructions. The instructions may include a set of instructions that, when executed by one or more processors, cause the one or more processors to determine a conversion rate associated with a loyalty program offered by a merchant. The conversion rate may specify a monetary value allotted to a loyalty point in the loyalty program. The conversion rate, associated with the loyalty program, may change over time. The conversion rate may be determined without user input. The set of instructions, when executed by the one or more processors, may further cause the one or more processors to: receive an instruction to lock the conversion rate for a period of time; lock the conversion rate as a locked conversion rate for the period of time based on the instruction; and use the locked conversion rate to apply a discount to a purchase during the period of time. The locked conversion rate at a time of the purchase may be different from the conversion rate offered by the loyalty program at the time of the purchase.

According to some implementations, a method, performed by one or more processors of one or more devices, may include determining a conversion rate associated with a loyalty program offered by a merchant; receiving an instruction to lock the conversion rate for a period of time; locking the conversion rate as a locked conversion rate for the period of time based on the instruction; and permitting the locked conversion rate to be used to apply a discount to a purchase during the period of time. The conversion rate may specify a monetary value allotted to a loyalty point in the loyalty program. The conversion rate, associated with the loyalty program, may change over time. The conversion rate may be determined without user input specifying the conversion rate. The locked conversion rate at a time of the purchase may be different from the conversion rate offered by the loyalty program at the time of the purchase.

DETAILED DESCRIPTION

The following detailed description of example implementations refers to the accompanying drawings. The same reference numbers in different drawings may identify the same or similar elements.

Customer loyalty for repeat business and the risk of attrition present a problem to merchants because customers can access on-line tools to search products and/or compare prices for the same or similar products and/or services between merchants. If another merchant is offering a desirable product and/or service at a lower sale price, customers can easily switch from one merchant to another in order to benefit from the lower sale price. General coupons, mail-in rebates, and discounts by a merchant are not sufficiently personalized to guarantee loyalty and prevent attrition.

Implementations described herein may provide a loyalty program that is personalized to customers and that encourages customers to return to the same merchant for purchasing additional products or services. The loyalty program may use incentives that make simple price comparisons among merchants less straightforward, thereby reducing customer attrition.

Figure 1A:
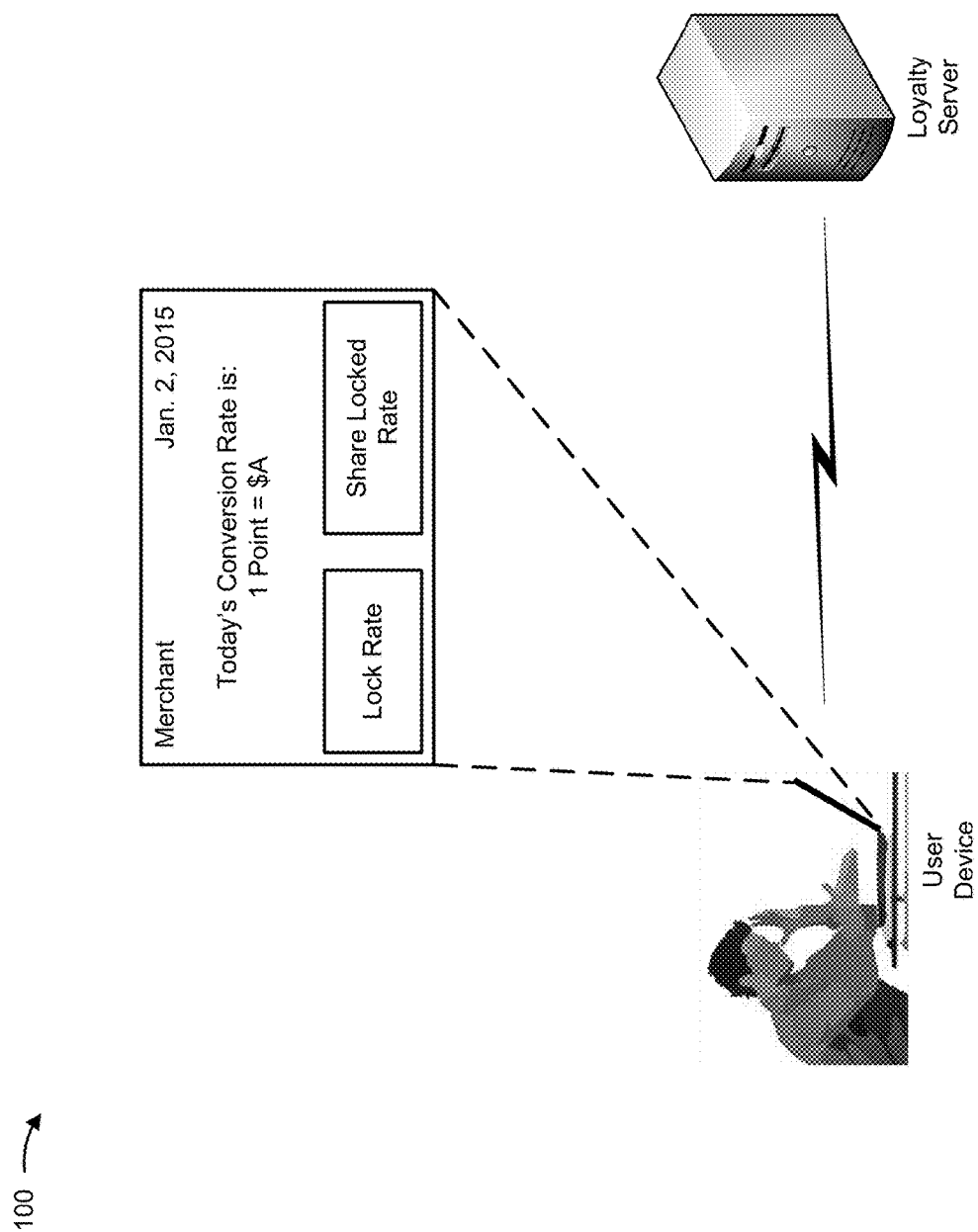
FIGS. 1A and 1B are diagrams of an overview of an example implementation described herein.
Figure 1B:
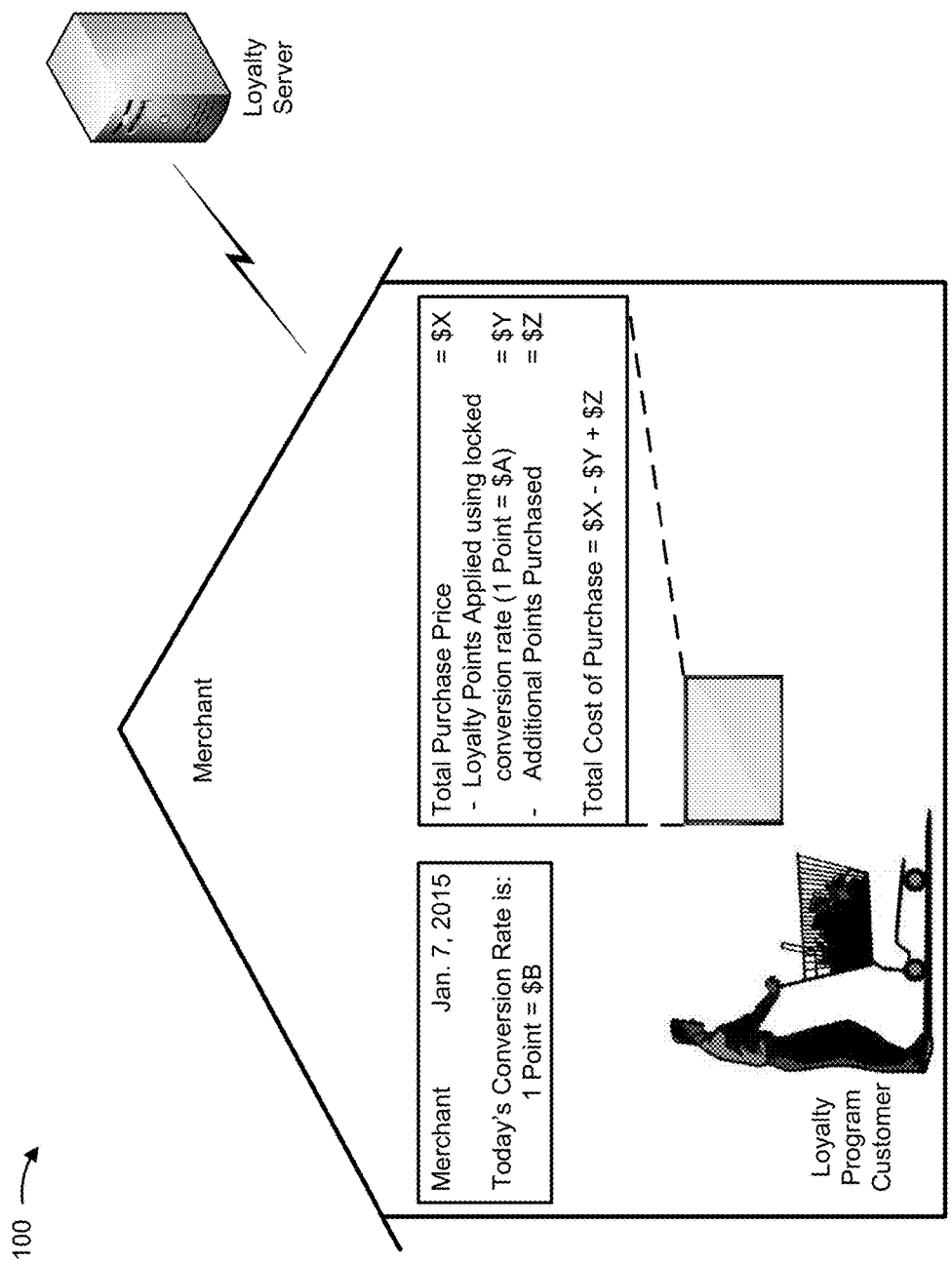

FIGS. 1A and 1B are diagrams of an overview of an example implementation 100 described herein. As shown in FIG. 1A, example implementation 100 may include a loyalty server and a user device, such a personal computer. The user device may present, on a display, information provided by the loyalty server.

As shown in FIG. 1A, the loyalty server may present information, including a dynamic loyalty program conversion rate ("conversion rate") that can be applied to loyalty points accumulated through past purchases by a loyalty program member in order to receive monetary discounts for present or future purchases. For example, the loyalty server may present a conversion rate of $A for each loyalty point accumulated by the loyalty program member.

As further shown in FIG. 1A, the loyalty server may provide the ability to lock the conversation rate for a particular period of time (the "lock period"). For example, the loyalty server may provide the ability to lock the conversion rate of $A for each loyalty point accumulated by the loyalty program member during the lock period. The loyalty server may also provide the ability to share the locked conversion rate with other loyalty program members. For example, the loyalty program member may lock the conversion rate for use by the loyalty program member during the lock period and share the locked conversion rate for use by the other loyalty program members. The other loyalty program members may use the shared locked conversion rate for their own accumulated loyalty points, during the lock period or a new lock period, for discounted purchasing of products and/or services from the merchant.

As shown in FIG. 1B, the conversion rate is dynamic and may change based on parameters set by the loyalty server. For example, the loyalty server may change, after a designated period of time, the conversion rate from 1 loyalty point=$A as shown in FIG. 1A to 1 loyalty point=$B as shown in FIG. 1B. The loyalty program member, however, may use the conversion rate of 1 loyalty point=$A as locked on a previous occasion for a purchase, even though the current conversion rate is 1 loyalty point=$B. This may be particularly beneficial when $A>$B. As shown in FIG. 1B, assume that the loyalty program member wants to purchase a product valued at $X. The loyalty program member may use the locked rate of $A, and receive a discount of $A*(total loyalty points accumulated) equaling $Y that can be subtracted from the original price of $X.

As further shown in FIG. 1B, the loyalty server may also provide the loyalty program member with the opportunity to purchase additional loyalty points based on the present sale. For example, the loyalty program member may purchase additional loyalty points for a fee of $Z. The total cost of the purchase to the loyalty program member, utilizing the previously locked conversion rate and choosing to purchase additional loyalty points, will equal $X−$Y+$Z. Thus, the loyalty program member will be incentivized to return to the merchant based on the ability to lock conversion rates and apply the locked conversion rates to future purchases. The loyalty program member will also be incentivized to return to the merchant based on the ability to purchase additional loyalty points to be used towards future purchases. The dynamic nature of the conversion rate and the ability to purchase additional loyalty points makes simple price comparisons difficult. The ability to check current conversion rates and share locked conversion rates among loyalty program members in an on-line format generates additional web traffic to the merchant's on-line website and creates additional goodwill for the merchant.

Figure 2:
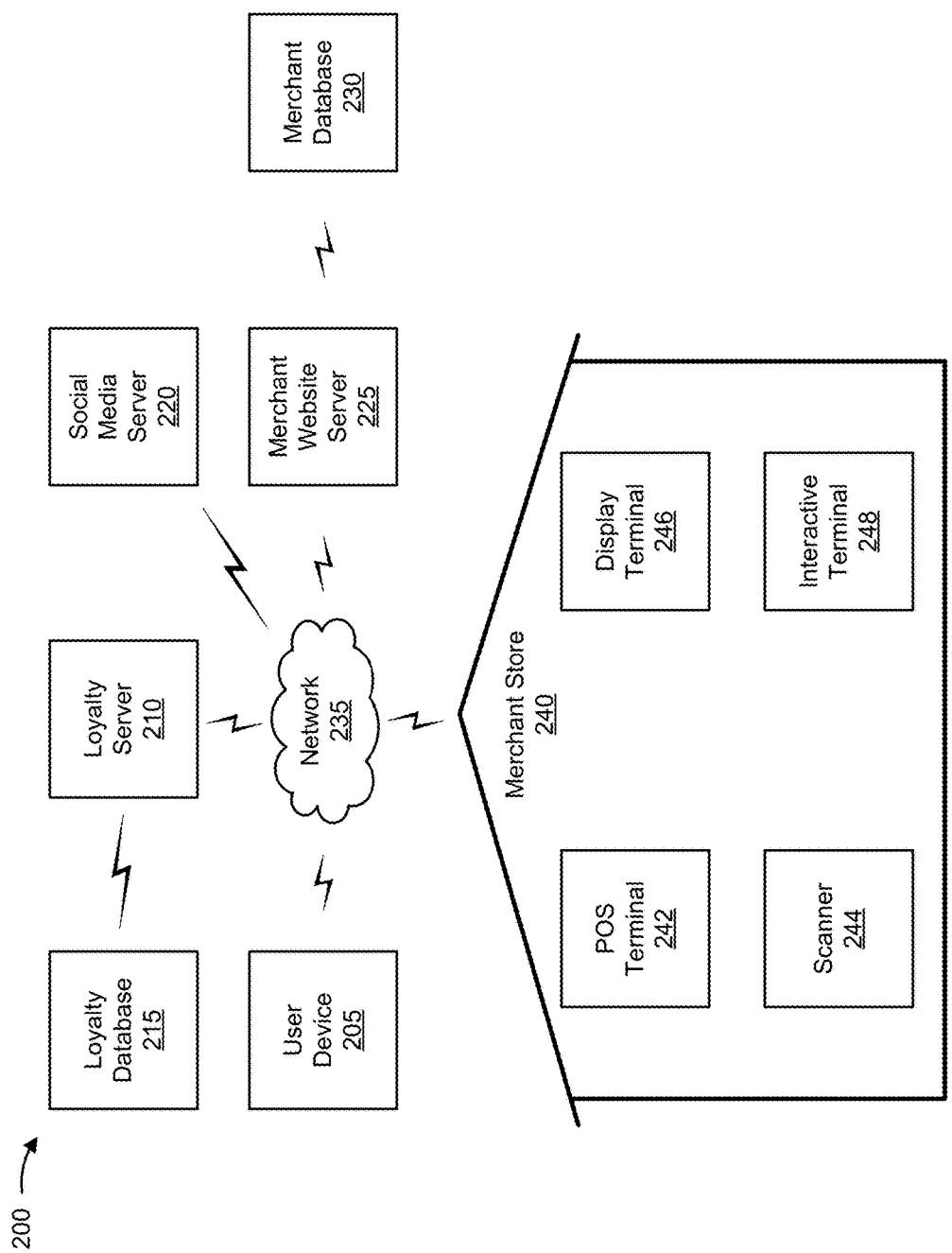
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a loyalty server 210, a loyalty database 215, a social media server 220, a merchant website server 225, a merchant database 230, a network 235, and devices of a merchant store 240, shown as a point-of-sale ("POS") terminal 242, a scanner 244, a display terminal 246, and an interactive terminal 248. Devices of environment 200 may interconnect via wired connections, wireless connections, or a combination of wired and wireless connections.

User device 205 may include a device capable of providing, presenting, and/or displaying information. For example, user device 210 may include a mobile phone (e.g., a smart phone, a radiotelephone, etc.), a computing device (e.g., a desktop computer, a laptop computer, a tablet computer, a handheld computer, etc.), or a similar device. In some implementations, user device 205 may include a touch screen display that allows a user to provide input to user device 205. Additionally, or alternatively, user device 205 may include a communication interface that allows user device 205 to receive information from and/or transmit information to loyalty server 210, social media server 220, merchant website server 225, POS terminal 242, scanner 244, display terminal 246, and/or interactive terminal 248.

Loyalty server 210 may include one or more server devices capable of generating, processing, and/or providing information. In some implementations, loyalty server 210 may generate, process, store, and/or provide loyalty program parameter information, merchant information, competitor information, user account information, and/or conversion rate information to user device 205, POS terminal 242, display terminal 246, and/or interactive terminal 248. Additionally, or alternatively, loyalty server 210 may include a communication interface that allows loyalty server 210 to receive information from and/or transmit information to loyalty database 215.

Loyalty database 215 may include one or more devices capable of processing, storing, and/or providing information. In some implementations, loyalty database 215 may process, store, and/or provide loyalty program parameter information, merchant information, competitor information, user account information, and/or conversion rate information (described in more detail with regard to FIG. 4).

Social media server 220 may include one or more server devices capable of generating, processing, and/or providing information. In some implementations, social media server 220 may generate, process, and/or provide one or more social media applications and/or websites that include the ability to share locked conversion rate and other loyalty program information provided by user device 205, loyalty server 210, merchant website server 225, POS terminal 242, and/or interactive terminal 248. Social media server 220 may permit a loyalty program member or a merchant to share information regarding a current or locked conversion rate.

Merchant website server 225 may include one or more server devices capable of generating, processing, and/or providing information. Merchant website server 225 may host a merchant's website that may offer various products and/or services, of the merchant, for sale. In some implementations, merchant website server 225 may generate, process, and/or provide merchant information, determine competitor information, and/or provide loyalty program member user account information.

Merchant database 230 may include one or more devices capable of processing, storing, and/or providing information. In some implementations, merchant database 230 may process, store, and/or provide loyalty program parameter information, merchant information, competitor information, loyalty program member user account information, and/or conversion rate information. In some implementations, loyalty database 215 and merchant database 230 may be the same database or the same collection of databases. In some implementations, merchant database 230 may store a subset of the information stored by loyalty database 215, or loyalty database 215 may store a subset of the information stored by merchant database 230.

Network 235 may include one or more wired and/or wireless networks. For example, network 235 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Merchant store 240 may include a traditional brick-and-mortar store, housing devices, such as POS terminal 242, scanner 244, display terminal 246, and/or interactive terminal 248.

POS terminal 242 may include a device that facilitates a check-out process for a purchase made in merchant store 240. POS terminal 242 may include a communications interface allowing communication with user device 205, loyalty server 210, social media server 220, merchant website server 225, scanner 244, display terminal 246, and/or interactive terminal 248.

Scanner 244 may include an input/output device that may be coupled to POS terminal 242 or interactive terminal 248. Scanner 244 may be configured to read or scan a card, such as a loyalty program member's merchant card. The merchant card may include a barcode or magnetic strip that may be read by the scanner and may store loyalty program user account information.

Display terminal 246 may include any digital or analog display that is capable of presenting audio and/or video content provided by loyalty server 210 and/or merchant website server 225. Display terminal 246 may include a technology, such as a cathode ray tube (CRT) display, a liquid crystal display (LCD), a light-emitting diode (LED) display, a plasma display, etc. Examples of display terminal 246 may include a television, a projector, a computer monitor, and/or another type of device capable of presenting audible and/or visual content.

Interactive terminal 248 may include an input device (e.g., a keyboard, a mouse, a button, a pen, a touch screen, a voice recognition and/or biometric mechanism, etc.) that may be capable of receiving information from a user. Interactive terminal 248 may also include a communications interface allowing communication with user device 205, loyalty server 210, social media server 220, merchant website server 225, POS terminal 242, scanner 244, and/or display terminal 246. Interactive terminal 248 may also include a digital or analog display that is capable of presenting audible and/or visual content provided by user device 205, loyalty server 210, social media server 220, merchant website server 225, and/or scanner 244.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
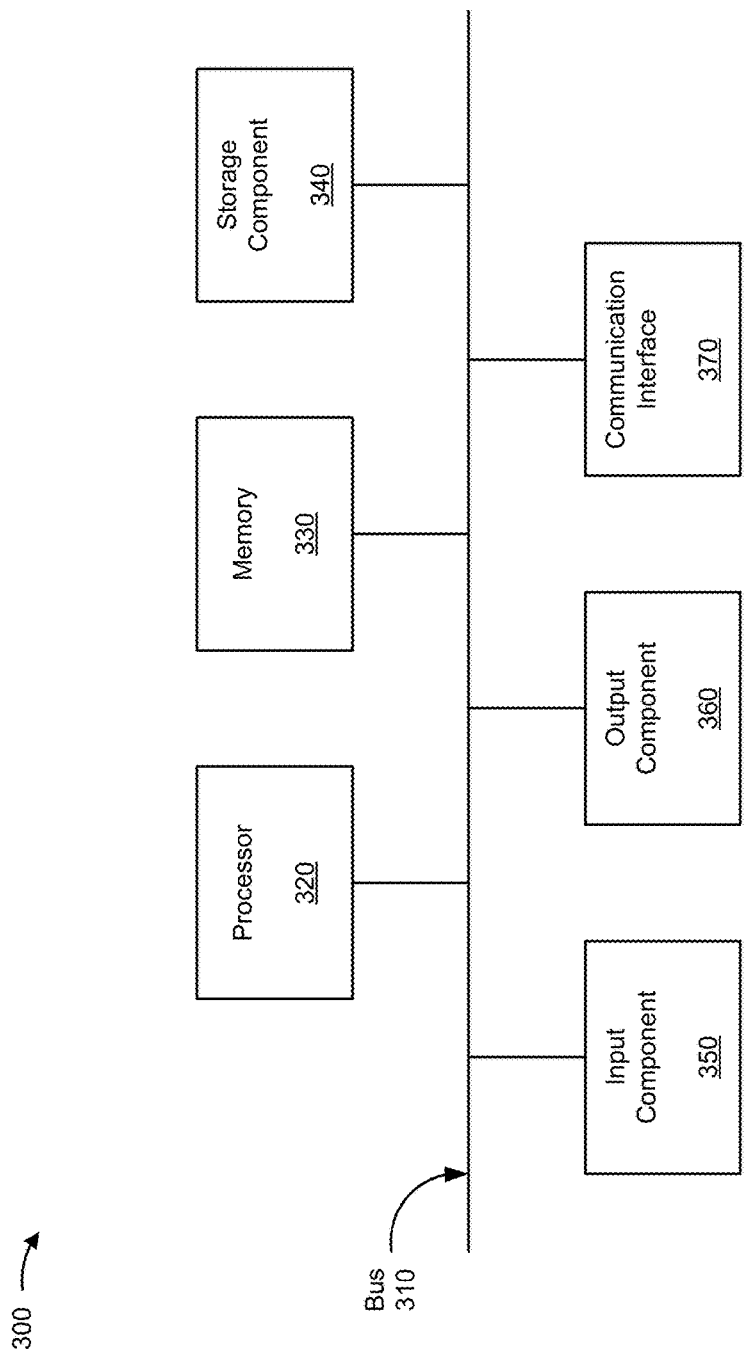
FIG. 3 is a diagram of example components of one or more devices of FIG. 2.

FIG. 3 is a diagram of example components of a device 300. Device 300 may correspond to user device 205, loyalty server 210, loyalty database 215, social media server 220, merchant website server 225, merchant database 230, POS terminal 242, scanner 244, display terminal 246, and interactive terminal 248 of FIG. 2. In some implementations, user device 205, loyalty server 210, loyalty database 215, social media server 220, merchant website server 225, merchant database 230, POS terminal 242, scanner 244, display terminal 246, and/or interactive terminal 248 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
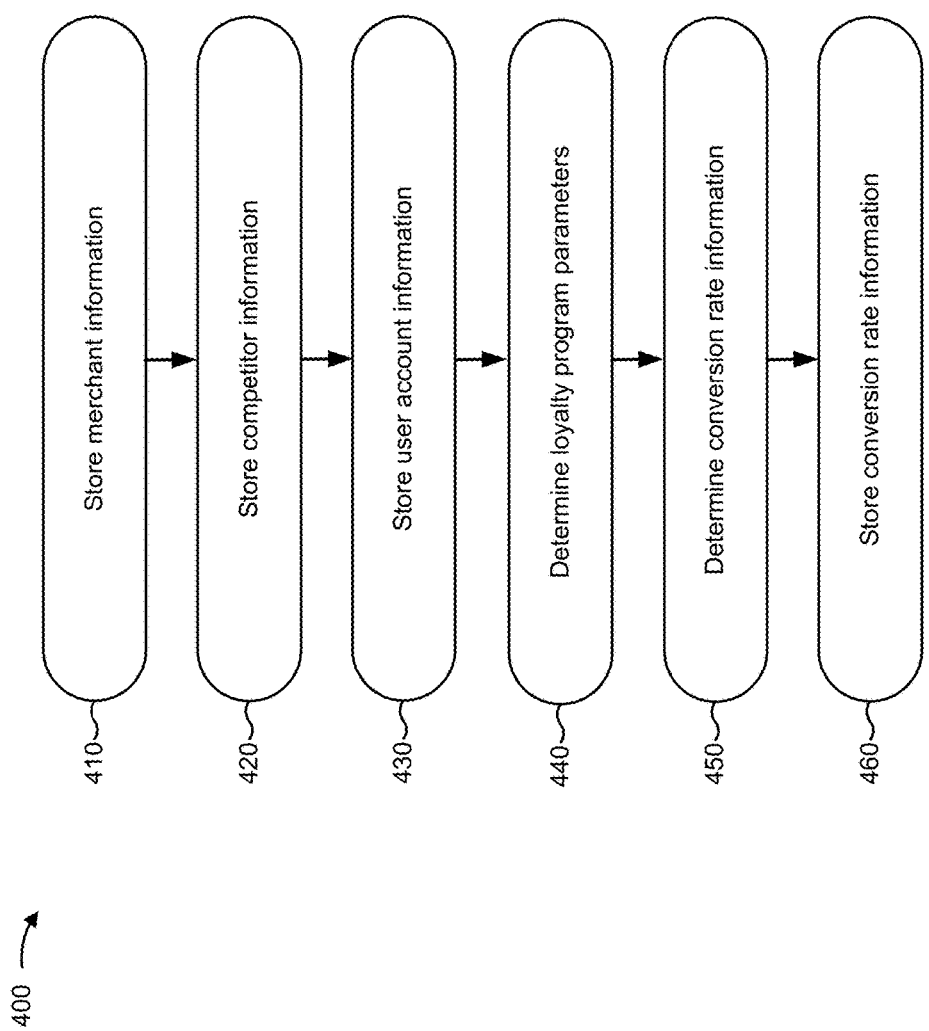
FIG. 4 is a flow chart of an example process for setting up a loyalty program for a merchant.

FIG. 4 is a flow chart of an example process 400 for setting up a loyalty program for a merchant. In some implementations, one or more process blocks of FIG. 4 may be performed by loyalty server 210. Additionally, or alternatively, one or more process blocks of FIG. 4 may be performed by another device or a group of devices separate from or including loyalty server 210, such as merchant website server 225.

As shown in FIG. 4, process 400 may include storing merchant information (block 410). For example, loyalty server 210 may receive merchant information from merchant website server 225 or another device or set of devices associated with the merchant. The merchant information may include the merchant's own sales data and/or offers for sale data. Additionally, or alternatively, the merchant information may include historical data and/or profitability information. In some implementations, loyalty server 210 may store the merchant information in loyalty database 215. In some implementations, loyalty server 210 may store the merchant information in another memory device or a collection of memory devices accessible by loyalty server 210.

As further shown in FIG. 4, process 400 may include storing competitor information (block 420). For example, loyalty server 210 may receive the competitor information from a data feed, merchant website server 225, and/or another device, such as a device associated with a competitor of the merchant or a third party device that collects competitor information regarding a set of competitors in an industry. The competitor information may include sales data and/or offers for sale data for other merchants in competition with the merchant offering the loyalty program. In some implementations, loyalty server 210 may store the competitor information in loyalty database 215. In some implementations, loyalty server 210 may store the competitor information in another memory device or a collection of memory devices accessible by loyalty server 210.

As further shown in FIG. 4, process 400 may include storing user account information (block 430). For example, loyalty server 210 may receive user account information from user device 205, POS terminal 242, scanner 244, interactive terminal 248, and/or another device associated with a loyalty program member or the merchant. The user account information may identify, for a loyalty program member, the loyalty program member's username, password, account identifier, personal information (e.g., address, telephone number, e-mail address, etc.), purchasing history, quantity of loyalty points accumulated, assigned loyalty tier, conversion rate (i.e., locked conversion rate or current conversion rate), demographic information, social media information, and/or other information relating to the loyalty program member. In some implementations, loyalty server 210 may receive some or all of the user account information only with the permission of the loyalty program member. In some implementations, loyalty sever 210 may store the user account information in loyalty database 215. In some implementations, loyalty server 210 may store the user account information in another memory device or a collection of memory devices accessible by loyalty server 210.

As further shown in FIG. 4, process 400 may include determining loyalty program parameters (block 440). For example, loyalty server 210 may receive input to be used in determining loyalty program parameters. In some implementations, loyalty server 210 may receive input, from an operator of loyalty server 210, merchant website server 225, and/or another device, to determine one or more of the loyalty program parameters.

In some implementations, loyalty sever 210 may automatically determine one or more loyalty program parameters, using, for example, the merchant information, the competitor information, the user account information, and/or some other information. For example, loyalty server 210 may determine one or more loyalty program parameters based on the merchant information and/or the competitor information (e.g., based on sales of the merchant and/or the competitor being greater than a first threshold for a period of time, being less than a second threshold for a period of time, being stagnant for a period of time, etc.). Additionally, or alternatively, loyalty server 210 may determine one or more loyalty program parameters based on the user account information (e.g., based on loyalty point accumulation, purchases, etc. of a set of loyalty point members). Additionally, or alternatively, loyalty server 210 may determine one or more loyalty program parameters based on a schedule (e.g., at a predetermined date or time, on a reoccurring interval, such as daily, weekly, monthly, or yearly, during a holiday season, etc.). These are just a few examples of loyalty server 210 automatically determining one or more loyalty program parameters, and other ways of automatically determining loyalty program parameters are possible.

In some implementations, the loyalty program parameters may include an earning parameter. For example, the earning parameter may identify a quantity of loyalty points that a loyalty program member may earn based on an amount of money spent on the merchant's products or services (e.g., a loyalty program member can earn one loyalty point for every dollar spent on the merchant's products or services, two loyalty points for every dollar spent on the merchant's products or services, one loyalty point for every two dollars spent on the merchant's products or services, or the like). A loyalty program member can accumulate loyalty points through on-going purchases made from the merchant to earn various benefits and discounts.

In some implementations, the earning parameter may specify that a loyalty program member can accumulate loyalty points through purchases made from another merchant that has a relationship with the merchant. In other words, the earning parameter may specify that a loyalty program member's purchases of the merchant's products or services and purchases of the other merchant's products or services will earn loyalty points for the loyalty program member. In some implementations, a quantity of loyalty points that a loyalty program member may earn based on an amount of money spent may be different for purchases with the merchant than purchases with the other merchant. While the description to follow will focus on purchases made of the merchant's products or services, the description equally applies to purchases made of the other merchant's products or services.

In some implementations, a value of the earning parameter may be different for different loyalty program members, which permits the loyalty program to be tailored for each individual loyalty program member. In some implementations, a value of the earning parameter may be dynamic. For example, a value of the earning parameter may change based on a quantity of loyalty points that a loyalty program member has accumulated (e.g., a value of the earning parameter may increase for higher accumulations of loyalty points and decrease for lower accumulations of loyalty points, or may decrease for higher accumulations of loyalty points and increase for lower accumulations of loyalty points). By dynamically changing a value of the earning parameter, the loyalty program may entice loyalty program members to spend more money with the merchant to accumulate additional loyalty points. Additionally, or alternatively, a value of the earning parameter may change periodically (e.g., on a daily basis, a weekly basis, an hourly basis, an on demand basis, etc.). Periodically changing a value of the earning parameter may cause loyalty program members to remain engaged in the loyalty program to track the changing earning parameter.

Additionally, or alternatively, the loyalty program parameters may include loyalty tiers. In some implementations, loyalty server 210 may assign loyalty program members to two or more loyalty tiers (e.g., a platinum, a gold, and a silver loyalty tier; a first, a second, and a third loyalty tier; a high and a low loyalty tier, etc.). For example, a loyalty program member may be assigned to a particular loyalty tier based on the loyalty program member's purchasing history and/or a quantity of loyalty points accumulated by the loyalty program member over a particular period of time. Loyalty program members belonging to a highest loyalty tier may be eligible for the highest level of benefits and discounts, followed by a next highest loyalty tier, and so forth.

In some implementations, the loyalty tiers may be dynamic as to the quantity of loyalty tiers offered, the quantity of loyalty points needed for assignment of a loyalty program member to a loyalty tier, or the like. In some implementations, loyalty server 210 may set the loyalty tiers based on various factors, such as a quantity of loyalty program members in a loyalty tier or across all loyalty tiers in a given period, a quantity of new loyalty program members added to a loyalty tier or across all loyalty tiers in a given period, a volume of sales generated by loyalty program members in a loyalty tier or across all loyalty tiers in a given period, an average amount of loyalty points earned by loyalty program members in a loyalty tier or across all loyalty tiers in a given period, or the like. By dynamically setting the loyalty tiers, the loyalty program may help keep loyalty program members engaged and may entice loyalty program members to spend more money with the merchant to accumulate additional loyalty points to reach a higher loyalty tier.

Additionally, or alternatively, the loyalty program parameters may include a purchasing parameter. A purchasing parameter may allow loyalty program members to earn additional loyalty points (e.g., based on the loyalty points earned through a current purchase, based on the total loyalty points accumulated to date, based on a fixed number of additional loyalty points, etc.) by paying an additional fee (e.g., a fixed fee, a percentage of the total purchase price of the current purchase, etc.). For example, assume that a loyalty program member spends $100 for merchant products and/or services, entitling the loyalty program member to earn 100 loyalty points from the purchase. The earning parameter for the loyalty program, here, is one loyalty point for every dollar spent. The loyalty program member may be permitted to pay an additional percentage of the total sale price (e.g., some percentage of the total sale price of $100) to receive some additional points (e.g., double the loyalty points earned from the purchase or 200). This is just one example and other ways of purchasing additional loyalty points are possible.

In some implementations, the purchasing parameter may be dynamic (e.g., based on a volume of merchant's sales for a given period, a volume of a competitor's sales for a given period, a quantity of times that a loyalty program member earned additional points through purchases for a given period, etc.). By dynamically changing the purchasing parameter, the loyalty program may entice loyalty program members to spend additional money with the merchant to purchase additional loyalty points. Additionally, or alternatively, the purchasing parameter may change periodically (e.g., on a daily basis, a weekly basis, an hourly basis, an on demand basis, etc.). Periodically changing the purchasing parameter may cause loyalty program members to remain engaged in the loyalty program to track the changing purchasing parameter.

Additionally, or alternatively, the loyalty program parameters may include anniversary bonus information, which may allow a loyalty program member to earn additional loyalty points (e.g., a fixed number of additional loyalty points, a percentage of a total quantity of loyalty points accumulated, a random drawing of loyalty points, etc.). The loyalty program member may earn additional loyalty points after a particular period of time and/or on a recurring basis (e.g., monthly, semi-annually, annually, etc.). For example, a loyalty program member may earn additional loyalty points based on a percentage (e.g., 5%, 10%, 20%, etc.) of the loyalty program member's total (or average) accumulated loyalty points at a particular recurring date (e.g., the anniversary of the loyalty program member's membership start-date). This is just one example of earning additional loyalty points through the anniversary bonus information, and other ways of earning additional loyalty points through the anniversary bonus information are possible. The anniversary bonus information may reward loyalty program members for their continued participation in the loyalty program.

The loyalty program parameters, described above, are simply examples of possible loyalty program parameters. Other types of loyalty program parameters are possible.

As further shown in FIG. 4, process 400 may include determining conversion rate information (block 450). For example, loyalty server 210 may use an input from an operator of loyalty server 210, merchant website server 225, and/or another device to determine conversion rate information. Additionally, or alternatively, loyalty server 210 may use the merchant information, the competitor information, the user account information, and/or other information from loyalty database 215 and/or another device to determine the conversion rate information. The conversion rate information may include a conversion rate. The conversion rate may identify the amount of monetary value assigned to a loyalty point and may be used to calculate discounts to prices for products and/or services offered by the merchant based on the loyalty points accumulated by a loyalty program member.

In some implementations, loyalty server 210 may use an automated method to determine the conversion rate (e.g., an algorithm, a formula, a random assignment from a pool of possible values, etc. to determine the conversion rate without user input). The automated method may use and/or analyze the merchant information, the competitor information, the user account information, and/or other information to determine the conversion rate. For example, loyalty server 210 may analyze the merchant's sales data (e.g., an overall volume of sales of the merchant's products and/or services, a volume of sales for specific merchandise of the merchant, a volume of sales at a certain retail location of the merchant, etc.) over a period of time, and may determine the conversion rate based on the analysis. For example, loyalty server 210 may determine to increase the conversion rate when the merchant's sales are low (e.g., when the merchant's sales data for a period of time is less than a threshold) to entice more purchases from loyalty program members when sales are low. Additionally, or alternatively, loyalty server 210 may determine to decrease the conversion rate when the merchant's sales are high (e.g., when the merchant's sales data for a period of time is greater than a threshold) to reduce discounts that are given when the merchant's sales are high.

Additionally, or alternatively, loyalty server 210 may analyze a competitor's sales data (e.g., an overall volume of sales of the competitor's products and/or services, a volume of sales for specific merchandise of the competitor, a volume of sales at a certain retail location of the competitor, etc.) over a period of time, and may determine the conversion rate based on the analysis. For example, loyalty server 210 may determine to increase the conversion rate when the competitor's sales are high (e.g., when the competitor's sales data for a period of time is greater than a threshold) to entice more purchases from the merchant when sales at the merchant's competitor are high. Additionally, or alternatively, loyalty server 210 may determine to decrease the conversion rate when the competitor's sales are low (e.g., when the competitor's sales data for a period of time is lower than a threshold) to reduce discounts that are given when sales at the merchant's competitor are low.

Additionally, or alternatively, loyalty server 210 may analyze other information (e.g., information identifying an upcoming holiday, an upcoming event, or another occasion for which it may be desired to influence an amount of traffic to the merchant), and may determine the conversion rate based on the analysis. For example, loyalty server 210 may determine to increase the conversion rate during a holiday season, toward the end of a tax accounting period, toward the end of a calendar year, etc. to entice more purchases from loyalty program members.

In some implementations, the conversion rate may be different for different loyalty program members, which permits the loyalty program to be tailored for each individual loyalty program member. For example, loyalty server 210 may determine the conversion rate based on the user account information (e.g., based on loyalty point accumulation, purchases, etc. of a loyalty point member).

In some implementations, different types of information may be used to determine the conversion rate. In some implementations, the different types of information may be weighted and combined to determine the conversion rate. In some implementations, the different types of information may be used to train a model that may be used to determine the conversion rate.

In some implementations, different conversion rates may be assigned to different loyalty tiers. For example, a conversion rate for the platinum loyalty tier may be a first monetary value (e.g., 5.5¢ per loyalty point), a conversion rate for the silver loyalty tier may be a second (lower) monetary value (e.g., 3.5¢ per loyalty point), and a conversion rate for the silver loyalty tier may be a third (still lower) monetary value (e.g., 2.5¢ per loyalty point).

In some implementations, the automated method used to determine the conversion rate may be dynamic (e.g., may change over time as to the algorithm, the formula, etc. used). In some implementations, the conversion rate may change periodically (e.g., on a daily basis, on a weekly basis, on an hourly basis, on an on demand basis, during a holiday season, etc.).

These are just a few examples of loyalty server 210 automatically determining the conversion rate, and other ways of automatically determining the conversion rate are possible.

In some implementations, the conversion rate information may include a lock rate parameter associated with the conversion rate. The lock rate parameter may allow the loyalty program member to lock a conversion rate available on a given day and use the locked conversion rate towards purchases during a lock period of time (e.g., twenty-four hours, one week, one month, etc.). The lock period of time will be referred to as the "lock period." After the lock period expires, the locked conversion rate may be unlocked, and the loyalty program member may utilize the current conversion rate towards purchases. The rate lock parameter may encourage loyalty program members to make purchases and use loyalty points by permitting the loyalty program members to lock the conversion rate when the current conversion rate is high and use the locked conversion rate when the current conversion rate later becomes lower.

In some implementations, the lock rate parameter may allow the loyalty program member to re-lock, within the lock period, with a new higher conversion rate. Additionally, or alternatively, with the re-lock, the original lock period may remain or may reset at the time of the re-lock to create a new lock period. In some implementations, the lock rate parameter may limit the number of re-locks (e.g., 2 re-locks, 5 re-locks, 10 re-locks, etc.) per some particular period of time (e.g., per month, two months, half-year, etc.). In some implementations, the lock rate parameter may limit the number of re-locks (e.g., 2 re-locks, 5 re-locks, 10 re-locks, etc.) per loyalty tier (e.g., a loyalty program member assigned to the platinum tier may be permitted more re-locks than a loyalty program member assigned to the gold tier).

As further shown in FIG. 4, process 400 may include storing the conversion rate information (block 460). For example, loyalty server 210 may store the conversion rate information. In some implementations, loyalty server 210 may store the conversion rate information in loyalty database 215. In some implementations, loyalty server 210 may store the conversion rate information in another memory device or a collection of memory devices accessible by loyalty server 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
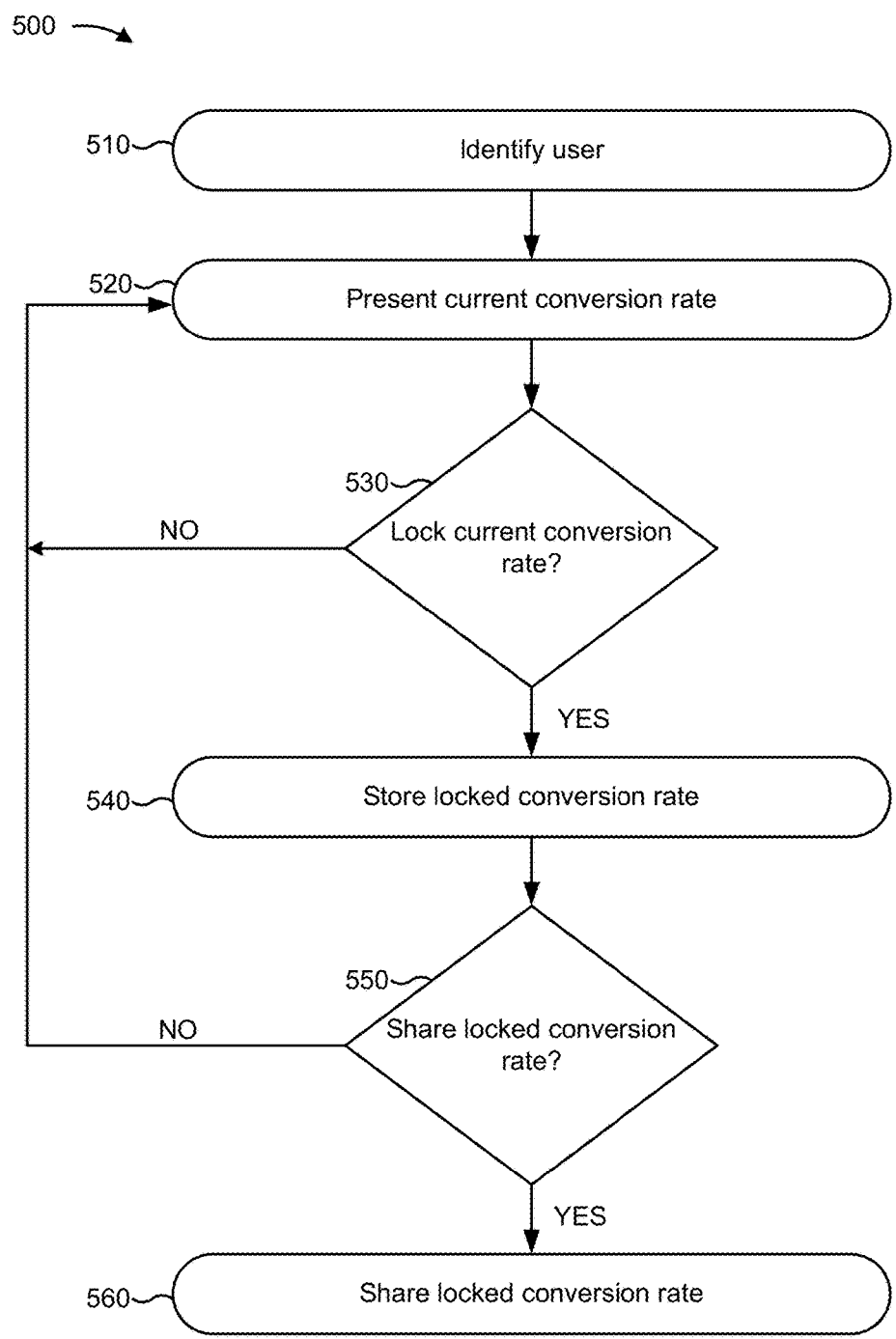
FIG. 5 is a flow chart of an example process for using a loyalty program to lock and/or share a conversion rate.

FIG. 5 is a flow chart of an example process 500 for using a loyalty program to lock and/or share a conversion rate in a loyalty program. In some implementations, one or more process blocks of FIG. 5 may be performed by loyalty server 210. Additionally, or alternatively, one or more process blocks of FIG. 5 may be performed by another device or a group of devices separate from or including loyalty server 210, such as social media server 220 and/or merchant website server 225.

As shown in FIG. 5, process 500 may include identifying a user (block 510). For example, loyalty server 210 may identify a user as a loyalty program member by receiving input matching user account information associated with the loyalty program member (e.g., username, password, account identifier, name, telephone number, etc.). In some implementations, the loyalty program member may provide login information to log into loyalty server 210 using a device, such as user device 205, POS terminal 242, scanner 244, interactive terminal 248, and/or another device. Loyalty server 210 may use the login information to identify the loyalty program member and the loyalty program member's user account information.

As further shown in FIG. 5, process 500 may include presenting a current conversion rate (block 520). For example, loyalty server 210 may present the current conversion rate for one or more loyalty tiers (e.g., a current conversion rate for the platinum loyalty tier, a current conversion rate for the gold loyalty tier, a current conversion rate for the silver loyalty tier, etc.) for display via the device being used by the loyalty program member. In some implementations, loyalty server 210 may present the current conversion rate for all loyalty tiers (regardless of the loyalty tier to which the loyalty program member is assigned). In this case, loyalty server 210 may present the current conversion rate prior to identifying the user as a loyalty program member. In some implementations, loyalty server 210 may present the current conversion rate for only the loyalty tier to which the loyalty program member is assigned. In this case, loyalty server 210 may use the user account information, associated with the loyalty program member, to determine the loyalty tier to which the loyalty program member is assigned. In this case, the loyalty program member may be permitted to request current conversion rates for the other loyalty tiers.

As further shown in FIG. 5, process 500 may include determining whether the current conversion rate is to be locked (block 530). For example, loyalty server 210 may present the loyalty program member with an option to lock the current conversion rate. The loyalty program member may lock the current conversion rate to keep the current conversion rate from changing for a period of time corresponding to the lock period. In some implementations, the locking of the current conversion rate may correspond to a re-locking of the conversion rate (e.g., if the loyalty program member has previously locked the conversion rate and the lock period has not yet expired). Loyalty server 210 may permit a loyalty program member to re-lock a conversion rate to take advantage of more favorable conversion rates (e.g., conversion rate increases) while protecting the loyalty program member from less favorable conversion rates (e.g., conversion rate decreases) during the lock period. Additionally, or alternatively, loyalty server 210 may permit a loyalty program member to obtain a more favorable lock rate and/or a longer lock period by paying a fee. This may permit the merchant to generate additional revenue.

As further shown in FIG. 5, when the current conversion rate is to be locked (block 530—Yes), process 500 may include storing the locked conversion rate (block 540). For example, when the loyalty program member selects the option to lock the conversion rate, loyalty server 210 may store conversion rate information, identifying the locked conversion rate and the lock period, in the user account information associated with the loyalty program member. In some implementations, loyalty server 210 may store the conversion rate information in loyalty database 215, merchant database 230, and/or another memory device. Additionally, or alternatively, loyalty server 210 may present the conversion rate information for display via the device being used by the loyalty program member.

As further shown in FIG. 5, process 500 may include determining whether to share the locked conversion rate (block 550). For example, loyalty server 210 may present the loyalty program member with an option to share the locked conversion rate with other loyalty program members. The loyalty program member may share the locked conversion rate with other loyalty program members (e.g., friends, family members, acquaintances, strangers, etc.) so that the other loyalty program members can also benefit from a favorable locked conversion rate. Another loyalty program member, who receives a shared, locked conversion rate, may use the shared, locked conversion rate for purchases made of the merchant's products and/or services by the other loyalty program member during the lock period. In some implementations, the lock period of a shared, locked conversion rate is the same as the lock period of the locked conversion rate (e.g., the loyalty member shares not only the locked conversion rate but also the lock period). In some implementations, a shared, locked conversion rate may obtain a new (or reset) lock period.

As further shown in FIG. 5, when the locked conversion rate is to be shared (block 550—Yes), process 500 may include sharing the locked conversion rate (block 560). For example, when the loyalty program member selects the option to share the locked conversion rate, loyalty server 210 may present the loyalty program member with one or more sharing options for sharing the locked conversion rate. Examples of sharing options include an option to share the locked conversion rate via e-mail, an option to share the locked conversion rate via text, an option to share the locked conversion rate via the merchant's website, and/or an option to share the locked conversion rate via a social media website. Other ways of sharing a locked conversion rate are possible. For example, when the loyalty program member selects the option to share the locked conversion rate, loyalty server 210 may automatically share the locked conversion rate without further input from the loyalty program member.

If the loyalty program member selects the option to share the locked conversion rate via e-mail, in some implementations, loyalty server 210 may request that the loyalty program member provide an e-mail address of another loyalty program member with which the locked conversion rate is to be shared. Loyalty server 210 may use the provided e-mail address to send an e-mail, to the other loyalty program member, that contains information that permits the other loyalty program member to accept the shared, locked conversion rate. If the loyalty program member selects the option to share the locked conversion rate via e-mail, in some implementations, loyalty server 210 may cause an e-mail program, associated with the loyalty program member, to be initiated, and may cause an e-mail to be created and a subject line and body of the e-mail to be automatically populated with information that permits another loyalty program member to accept the shared, locked conversion rate. The loyalty program member may populate the To field of the e-mail with an email address of the other loyalty program member with which the shared, locked conversion rate is to be shared, and may cause the e-mail to be sent using the e-mail program. If the other loyalty program member accepts the shared, locked conversion rate, loyalty server 210 may store conversion rate information, associated with the shared, locked conversion rate, in user account information associated with the other loyalty program member.

If the loyalty program member selects the option to share the locked conversion rate via text, in some implementations, loyalty server 210 may request that the loyalty program member provide a telephone number of another loyalty program member with which the locked conversion rate is to be shared. Loyalty server 210 may use the provided telephone number to send a text, to the other loyalty program member, that contains information that permits the other loyalty program member to accept the shared, locked conversion rate. If the loyalty program member selects the option to share the locked conversion rate via text, in some implementations, loyalty server 210 may cause a text program, associated with the loyalty program member, to be initiated, and may cause a text to be created and to be automatically populated with information that permits another loyalty program member to accept the shared, locked conversion rate. The loyalty program member may populate the To field of the text with a telephone number of the other loyalty program member with which the shared, locked conversion rate is to be shared, and may cause the text to be sent using the text program.

If the loyalty program member selects the option to share the locked conversion rate via the merchant's website, loyalty server 210 may request that the loyalty program member provide information identifying another loyalty program member with which the locked conversion rate is to be shared (e.g., an e-mail address, a username, a name, a telephone number, or the like). Loyalty server 210 may use the provided information to identify the other loyalty program member via user account information associated with the other loyalty program member. Loyalty server 210 may provide information, regarding the shared, locked conversion rate, to the other loyalty program member using information in the other loyalty program member's user account information. For example, loyalty server 210 may post information in the other loyalty program member's account (e.g., which would be accessible by or displayed when the other loyalty program member logs into the merchant's website). Additionally, or alternatively, loyalty server 210 may provide the information to the other loyalty program member in some other way.

If the loyalty program member selects the option to share the locked conversion rate via a social media website, in some implementations, loyalty server 210 may request that the loyalty program member provide log-in information, or the like, for the social media website. Loyalty server 210 may use the log-in information to post information regarding the shared, locked conversion rate to the loyalty program member's friends via the loyalty program member's page. If the loyalty program member selects the option to share the locked conversion rate via a social media website, in some implementations, loyalty server 210 may post information regarding the shared, locked conversion rate via the merchant's page on the social media website. In this case, loyalty server 210 may present the loyalty program member with information to permit the loyalty program member to share the post with the loyalty program member's friends on the social media website.

A particular loyalty program member, who receives and accepts a shared, locked conversion rate, may use the shared, locked conversion rate for purchases made of the merchant's products and/or services by the particular loyalty program member during the lock period. Thus, the particular loyalty program member may take advantage of a favorable conversion rate that has been locked by another loyalty program member.

When the current conversion rate is not to be locked (block 530—No) or when the locked conversion rate is not to be shared (block 550—No), process 500 may include returning to block 520 and continuing to present the current conversion rate.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6F are diagrams of an example implementation 600 relating to example process 500 shown in FIG. 5. In example implementation 600, loyalty server 210 may allow a loyalty program member to lock a conversion rate determined by loyalty server 210 for a lock period and share the locked conversion rate with other loyalty program members.

Assume that a user, John Smith, is a loyalty program member of a loyalty program offered by Merchant A. Assume that the loyalty program offers three loyalty tiers: a platinum tier for loyalty program members who have accumulated at least 4,500 loyalty points; a gold tier for loyalty program members who have accumulated at least 2,500 loyalty points but fewer than 4,500 loyalty points; and a silver tier for loyalty program members who have accumulated fewer than 2,500 loyalty points.

Figure 6A:
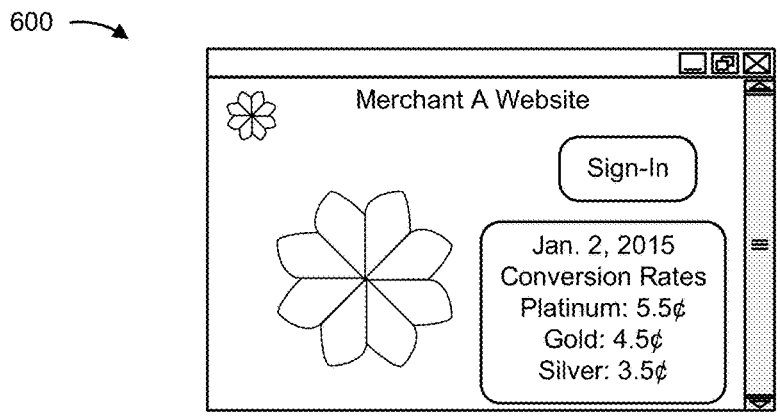
FIGS. 6A-6F are diagrams of an example implementation relating to the example process shown in FIG. 5.

Assume that the loyalty program member (John Smith) desires to check his accumulated loyalty points with Merchant A. The loyalty program member uses his computer to access a homepage of a website of Merchant A (e.g., via merchant website server 225). As shown in FIG. 6A, Merchant A's homepage includes a sign-in option for a visitor to log into the website to access the visitor's account. The homepage may also present information concerning a current conversion rate. As shown in FIG. 6A, the homepage identifies the current conversion rate for the platinum tier as 5.5¢, the current conversion rate for the gold tier as 4.5¢, and the current conversion rate for the silver tier as 3.5¢.

Figure 6B:
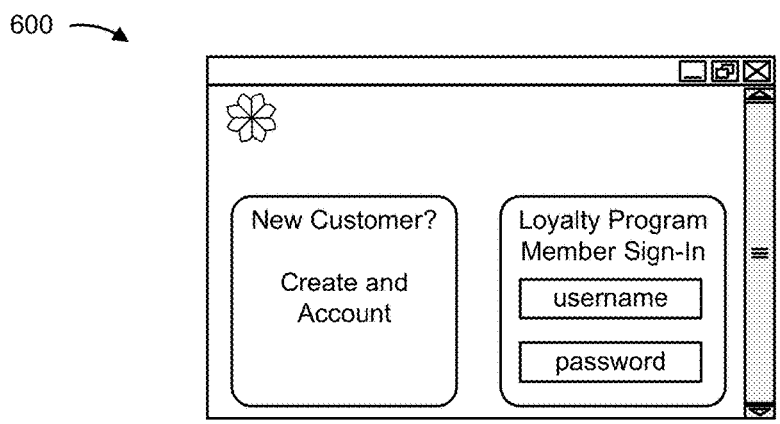

Assume that the loyalty program member desires to log into Merchant A's website and, therefore, selects the sign-in option. As shown in FIG. 6B, merchant website server 225 presents a log-in page that includes an option to create a new account (for new users of Merchant A's website) and an option to sign in (for registered users of Merchant A's website). Assume that the loyalty program member selects the option to sign in by providing login information in the form of a username and password. Merchant website server 225 may authenticate the login information using, for example, information stored in the loyalty program member's user account information.

Figure 6C:
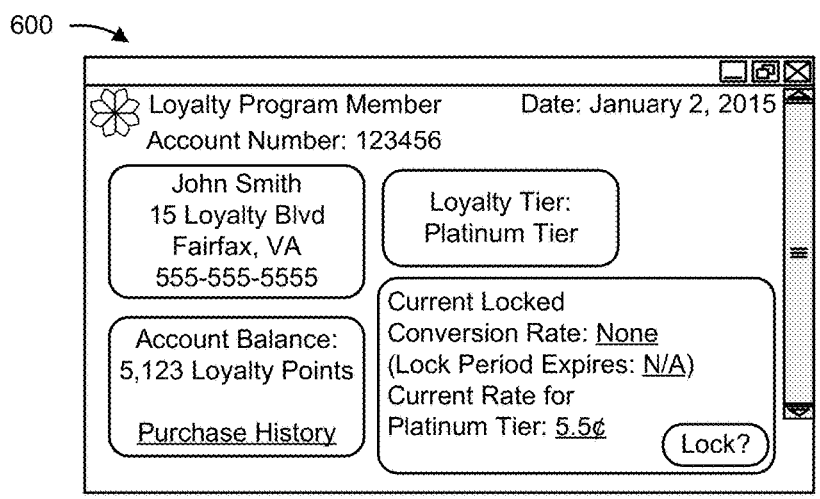

Upon successful authentication of the loyalty program member, merchant website server 225 presents a user account page, as shown in FIG. 6C. The user account page may present various user account information, such as contact information for the loyalty program member (e.g., John Smith, 15 Loyalty Blvd, Fairfax, Va., 555-555-5555), an account balance that identifies a total quantity of accumulated loyalty points (e.g., 5,123 loyalty points), a loyalty tier to which the loyalty member is assigned (e.g., platinum tier), and conversion rate information (e.g., no current locked conversion rate, no associated lock period, and a current conversion rate for the platinum tier of 5.5¢). The user account page may also provide the loyalty member with an option to lock in the current conversion rate (e.g., 5.5¢).

Figure 6D:
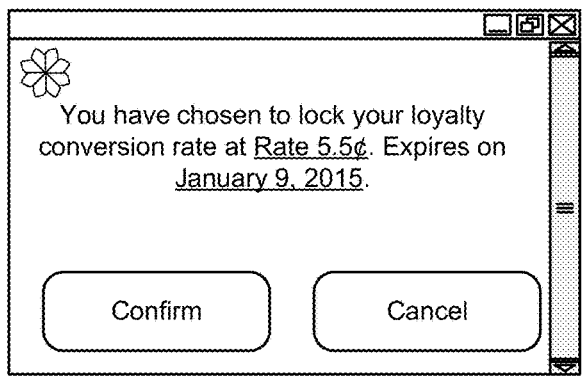

Assume that the loyalty program member selects the option to lock the current conversion rate of 5.5¢. Upon receiving a selection of the option, merchant website server 225 provides a confirmation page, as shown in FIG. 6D. The confirmation page identifies the current conversion rate (e.g., 5.5¢) and the lock period (e.g., Expires on Jan. 9, 2015). The confirmation page also requests the loyalty program member to confirm that the loyalty program member wants to lock the current conversion rate.

Figure 6E:
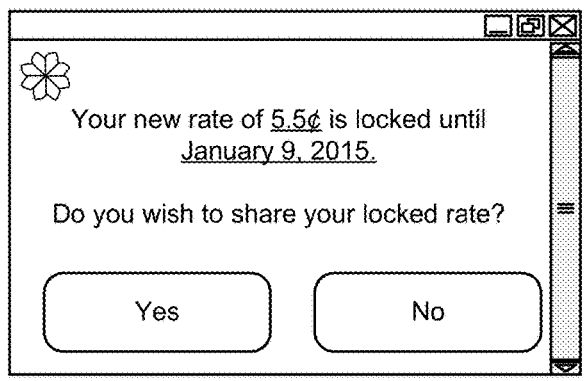

Assume that the loyalty program member confirms to lock the current conversion rate of 5.5¢. Upon receiving confirmation, merchant website server 225 provides a confirmation and share page, as shown in FIG. 6E. The confirmation and share page identifies the locked conversion rate (e.g., 5.5¢) and the lock period (e.g., Jan. 9, 2015). The confirmation and share page also provides the loyalty program member with an option to share the locked conversion rate.

Figure 6F:
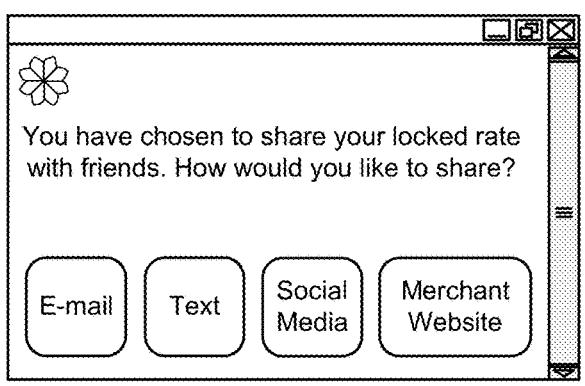

Assume that the loyalty program member selects the option to share the locked conversion rate of 5.5¢. Upon receiving a selection of the option, merchant website server 225 provides a share options page, as shown in FIG. 6F. The share options page identifies the options for sharing the locked conversion rate with other loyalty program members (e.g., via e-mail, text, social media, and merchant website). If the loyalty program member selects one of the options to share the locked conversion rate, then the loyalty program member may provide information (if necessary) to permit the locked conversion rate to be shared with one or more other loyalty program members.

While not specifically described with regard to the above-identified example implementation 600, loyalty server 210 may control the loyalty program information and may interact with and/or act through merchant website server 225 to provide the current conversion rate information, to process the locking of the conversion rate, and/or to process the sharing of the locked conversion rate.

As indicated above, FIGS. 6A-6F are provided merely as an example. Other examples are possible and may differ from what was described with regard to FIGS. 6A-F.

Figure 7:
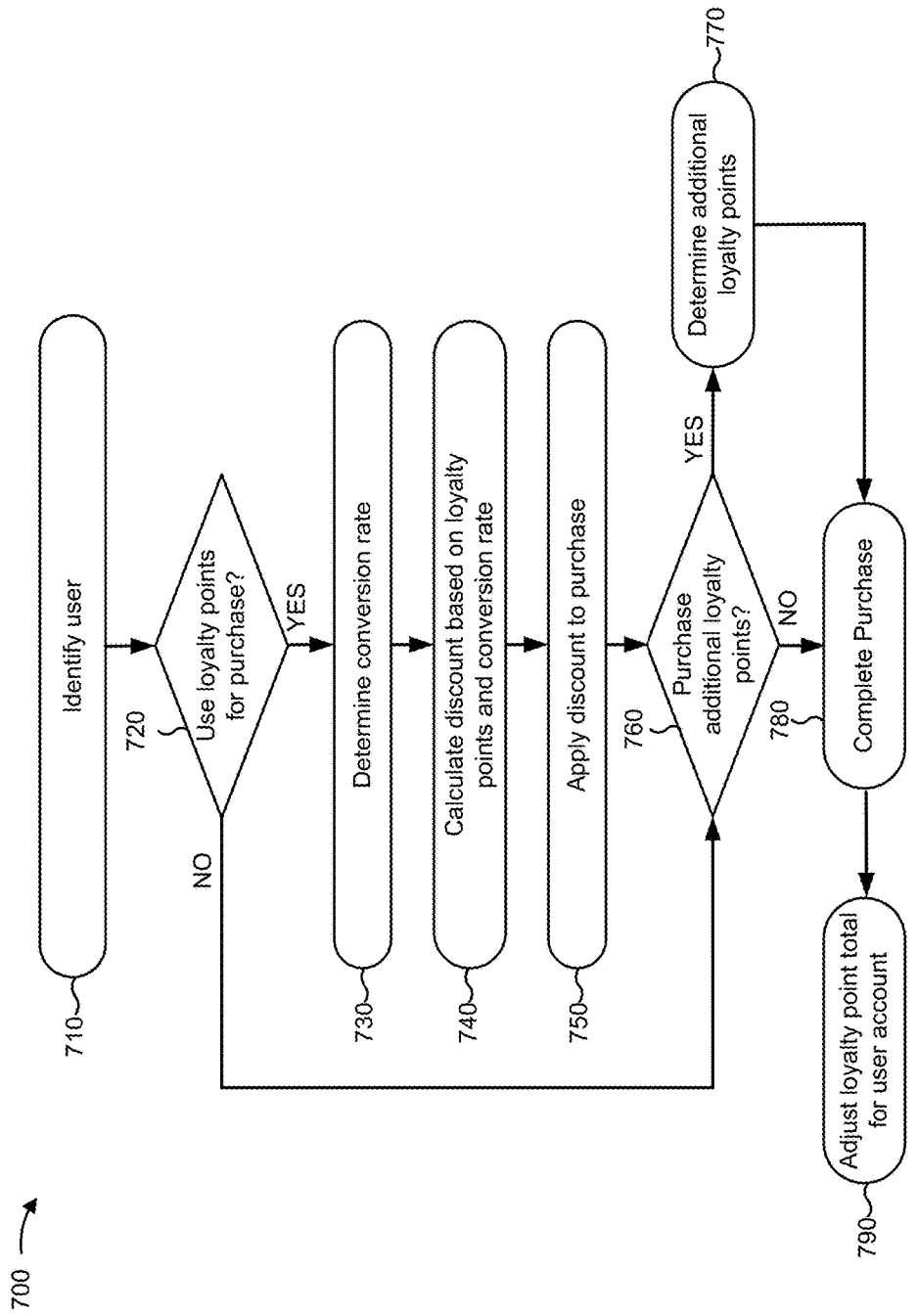
FIG. 7 is a flow chart of an example process for using a loyalty program to make a purchase.

FIG. 7 is a flow chart of an example process 700 for using a loyalty program to make a purchase. In some implementations, one or more process blocks of FIG. 7 may be performed by loyalty server 210. Additionally, or alternatively, one or more process blocks of FIG. 7 may be performed by another device or a group of devices separate from or including loyalty server 210, such as merchant website server 225, POS terminal 242, and/or interactive terminal 248.

As shown in FIG. 7, process 700 may include identifying a user (block 710). For example, loyalty server 210 may identify a user as a loyalty program member, of a loyalty program associated with a merchant, by receiving input matching user account information associated with the loyalty program member (e.g., username, password, account identifier, name, telephone number, etc.). In some implementations, the loyalty program member may provide login information to log into loyalty server 210 using a device, such as user device 205, POS terminal 242, scanner 244, interactive terminal 248, and/or another device. Loyalty server 210 may use the login information to identify the loyalty program member and the loyalty program member's user account information.

As further shown in FIG. 7, process 700 may include determining whether to use loyalty points, associated with the loyalty program member, for a purchase (block 720). For example, loyalty server 210 may determine a total quantity of loyalty points, accumulated by the loyalty program member, based on information stored in the user account information associated with the loyalty program member. Loyalty server 210 may also determine how many of those loyalty points that the loyalty program member desires to use towards a current purchase with the merchant. For example, the loyalty program member may provide input regarding a quantity of loyalty points, of the total quantity of loyalty points accumulated by the loyalty program member, via the device being used by the loyalty program member. The loyalty program member may use all, some, or none of their loyalty points towards the current purchase.

As further shown in FIG. 7, when loyalty points are to be used for the purchase (block 720—Yes), process 700 may include determining a conversion rate (block 730). For example, loyalty server 210 may determine whether the loyalty program member has an existing locked conversion rate based on information stored in the user account information associated with the loyalty program member. In some implementations, if the loyalty program member does not have an existing locked conversion rate, loyalty server 210 may use the current conversion rate, available from the loyalty program, as the conversion rate available to the loyalty program member. In some implementations, if the loyalty program member has an existing locked conversion rate (e.g., a locked conversion rate that is still valid because the lock period has not expired), loyalty server 210 may use the locked conversion rate as the conversion rate available to the loyalty program member.

As further shown in FIG. 7, process 700 may include calculating a discount based on the loyalty points and the conversion rate (block 740). For example, in some implementations, loyalty server 210 may calculate the discount based on multiplying the quantity of loyalty points, to be used for the current purchase, and the conversion rate. In some implementations, loyalty server 210 may calculate the discount using a mathematical function other than multiplication. In some implementations, the function and/or factors used to calculate the discount may be dynamic (e.g., change every day, every week, every month, every year, after a designated period, based on an occurrence of an event, etc.).

As further shown in FIG. 7, process 700 may include applying the discount to the purchase (block 750). For example, in some implementations, loyalty server 210 may apply the discount to a total purchase price, of the current purchase, by subtracting the discount from the total purchase price to obtain a final sale price. In some implementations, loyalty server 210 may calculate the final sale price using a mathematical function other than subtraction. In some implementations, the function and/or factors used to calculate the final sale price may be dynamic (e.g., change every day, every week, every month, every year, after a designated period, based on an occurrence of an event, etc.).

As further shown in FIG. 7, process 700 may include determining whether to purchase additional loyalty points (block 760). For example, loyalty sever 210 may present the loyalty program member with an option to purchase additional loyalty points. In some implementations, even when loyalty points are not to be used for the purchase (block 720—No), loyalty server 210 may present the loyalty program member with an option to purchase additional loyalty points. As described above with regard to FIG. 4, the loyalty program parameters of the loyalty program may include a purchasing parameter that permits a loyalty program member to purchase additional loyalty points. Loyalty server 210 may determine, based on the purchasing parameter, a condition for permitting the purchase of additional loyalty points and may provide the option to purchase additional loyalty points when the condition is satisfied.

As further shown in FIG. 7, when additional loyalty points are to be purchased (block 760—Yes), process 700 may include determining the additional loyalty points (block 770). For example, loyalty server 210 may determine a quantity of additional loyalty points to be purchased and a purchase amount to be paid to purchase this quantity of additional loyalty points. Loyalty server 210 may calculate an updated final sale price by adding the purchase amount to the final sale price. In some implementations, loyalty server 210 may calculate the updated final sale price using a mathematical function other than addition. In some implementations, the function and/or factors used to calculate the updated final sale price may be dynamic (e.g., change every day, every week, every month, every year, after a designated period, based on an occurrence of an event, etc.).

As further shown in FIG. 7, process 700 may include completing the purchase (block 780). For example, loyalty server 210 may complete the purchase by obtaining and/or processing payment information associated with the final sale price or the updated final sale price. The purchase may be completed when additional loyalty points are purchased (block 770) and when no additional loyalty points are purchased (block 760—No).

As further shown in FIG. 7, process 700 may include adjusting the loyalty point total for the user account (block 790). For example, loyalty server 210 may update the total quantity of loyalty points, accumulated by the loyalty program member, in the user account information associated with the loyalty program member. Loyalty server 210 may determine an amount of loyalty points to add to (or subtract from) the loyalty program member's total quantity of loyalty points based on a quantity of loyalty points earned for the current purchase, a quantity of loyalty points used for the current purchase, and/or a quantity of additional loyalty points purchased (i.e., loyalty points to add or subtract=quantity of loyalty points earned for the current purchase−quantity of loyalty points used for the purchase+ additional loyalty points purchased). Loyalty server 210 may update the total quantity of loyalty points by adding or subtracting the amount of loyalty points (e.g., based on whether the amount is a positive value or a negative value).

By permitting a loyalty member to lock a conversion rate and use the locked conversion rate for a purchase, the loyalty program may make it more difficult for the loyalty program member to compare prices among merchants selling an identical product. Further, by permitting a loyalty member to purchase additional loyalty points, the loyalty program may keep the loyalty member engaged in the loyalty program and loyal to the merchant.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

FIGS. 8A-8G are diagrams of an example implementation 800 relating to example process 700 shown in FIG. 7. FIGS. 8A-8G show an example of using a loyalty program to make a purchase.

Assume that a user, John Smith, is a loyalty program member of a loyalty program offered by Merchant A. Assume that the loyalty program member has accumulated 5,123 loyalty points. Assume further that the loyalty program member has visited a brick and mortar store of Merchant A and has selected a product (Product B) to purchase. This example implementation 800 could equally apply to an on-line purchase of the product.

Figure 8A:
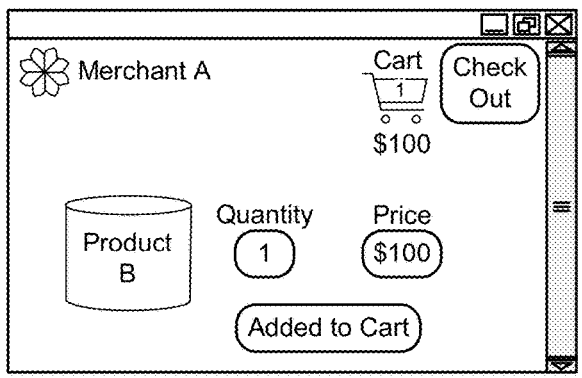
FIGS. 8A-8G are diagrams of an example implementation relating to the example process shown in FIG. 7.

The loyalty program member interacts with a self check-out POS terminal (e.g., POS terminal 242), within the store, to purchase the product. The loyalty program member scans a bar code on the product. As shown in FIG. 8A, POS terminal 242 presents a shopping cart page on an interactive display screen. The shopping cart page includes information regarding the product (e.g., Product B) and the total purchase price ($100). The shopping cart page also includes an option to check out.

Figure 8B:
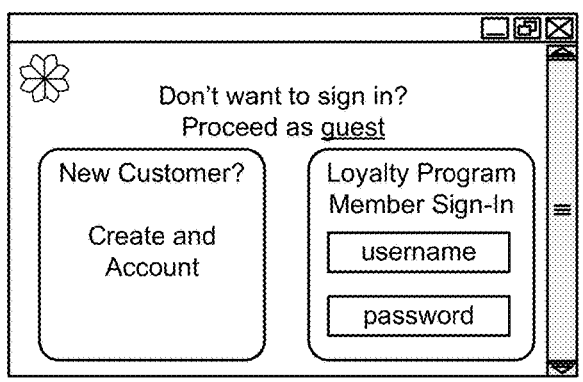

Assume that the loyalty program member desires to check-out and, therefore, selects the check-out option. As shown in FIG. 8B, POS terminal 242 presents a log-in page that includes an option to create a new account (for new users of Merchant A) and an option to sign in (for registered users of Merchant A). Assume that the loyalty program member selects the option to sign in by providing login information in the form of a username and password. POS terminal 242 may authenticate the login information using, for example, information stored in the loyalty program member's user account information.

Figure 8C:
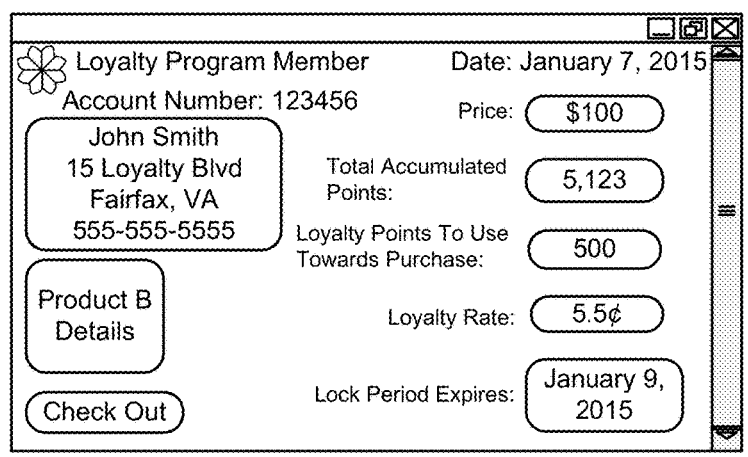

Upon successful authentication of the loyalty program member, POS terminal 242 presents a user account page, as shown in FIG. 8C. The user account page may present various user account information, such as contact information for the loyalty program member (e.g., John Smith, 15 Loyalty Blvd, Fairfax, Va., 555-555-5555), an account balance that identifies a total quantity of accumulated loyalty points (e.g., 5,123 loyalty points), and conversion rate information (e.g., locked conversion rate of 5.5¢, and a lock period expiration date of Jan. 9, 2015). The user account page may also provide information regarding the current purchase (e.g., total purchase price of $100 and Product B details). The user account page may permit the loyalty program member to input the quantity of loyalty points, of the total quantity of accumulated loyalty points, to apply towards the current purchase (e.g., 500 loyalty points).

Figure 8D:
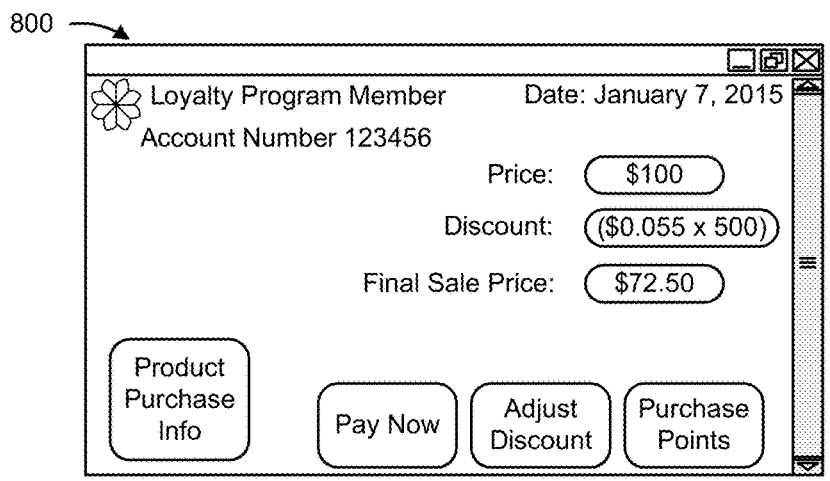

Assume that the loyalty program member indicates a desire to check out. Upon receiving an indication of the desire to check out, POS terminal 242 provides a check-out page, as shown in FIG. 8D. The check-out page identifies the total purchase price (e.g., $100), the discount to be applied (e.g., the quantity of loyalty points to be applied (e.g., 500) and the conversion rate (e.g., 5.5¢)), and the final sale price (e.g., $72.50). The check-out page provides the loyalty program member with options, such as an option to Pay Now (e.g., complete the check-out process), an option to Adjust Discount (e.g., increase or decrease the loyalty points applied), and an option to Purchase Points (e.g., purchase additional loyalty points for the current purchase).

Figure 8E:
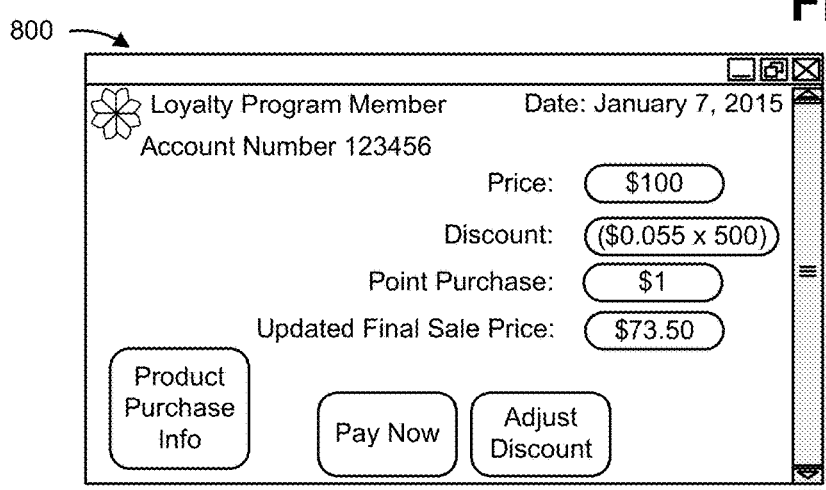

Assume that the loyalty program member indicates a desire to purchase additional loyalty points. Upon receiving an indication of the desire to purchase additional loyalty points, POS terminal 242 may provide information regarding the additional loyalty point purchase (e.g., the cost of purchasing additional loyalty points (e.g., $1), the quantity of additional loyalty points obtained for the cost (e.g., double points), etc.), and may provide an updated check-out page, as shown in FIG. 8E. The updated check-out page identifies the total purchase price (e.g., $100), the discount to be applied (e.g., the quantity of loyalty points to be applied (e.g., 500) and the conversion rate (e.g., 5.5¢)), the cost of the additional loyalty point purchase (e.g., $1), and the updated final sale price (e.g., $73.50). The updated check-out page provides the loyalty program member with options, such as an option to Pay Now (e.g., complete the check-out process), and an option to Adjust Discount (e.g., increase or decrease the loyalty points applied).

Figure 8F:
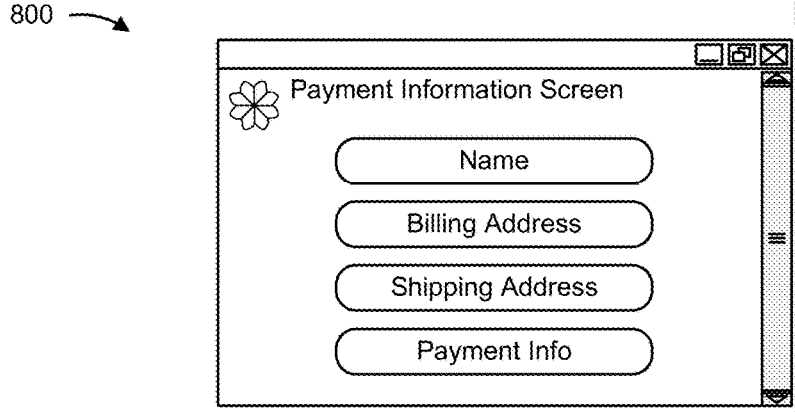

Assume that the loyalty program member indicates a desire to complete the check-out process by selecting the Pay Now option. Upon receiving a selection of the Pay Now option, POS terminal 242 provides a payment information page, as shown in FIG. 8F. The payment information page provides the loyalty program member with options to input his name, his billing address, his shipping address, and/or his payment information. In some implementations, some or all of this information may be stored in the user account information associated with the loyalty program member and the loyalty program member may be presented with an opportunity to confirm the information.

Figure 8G:
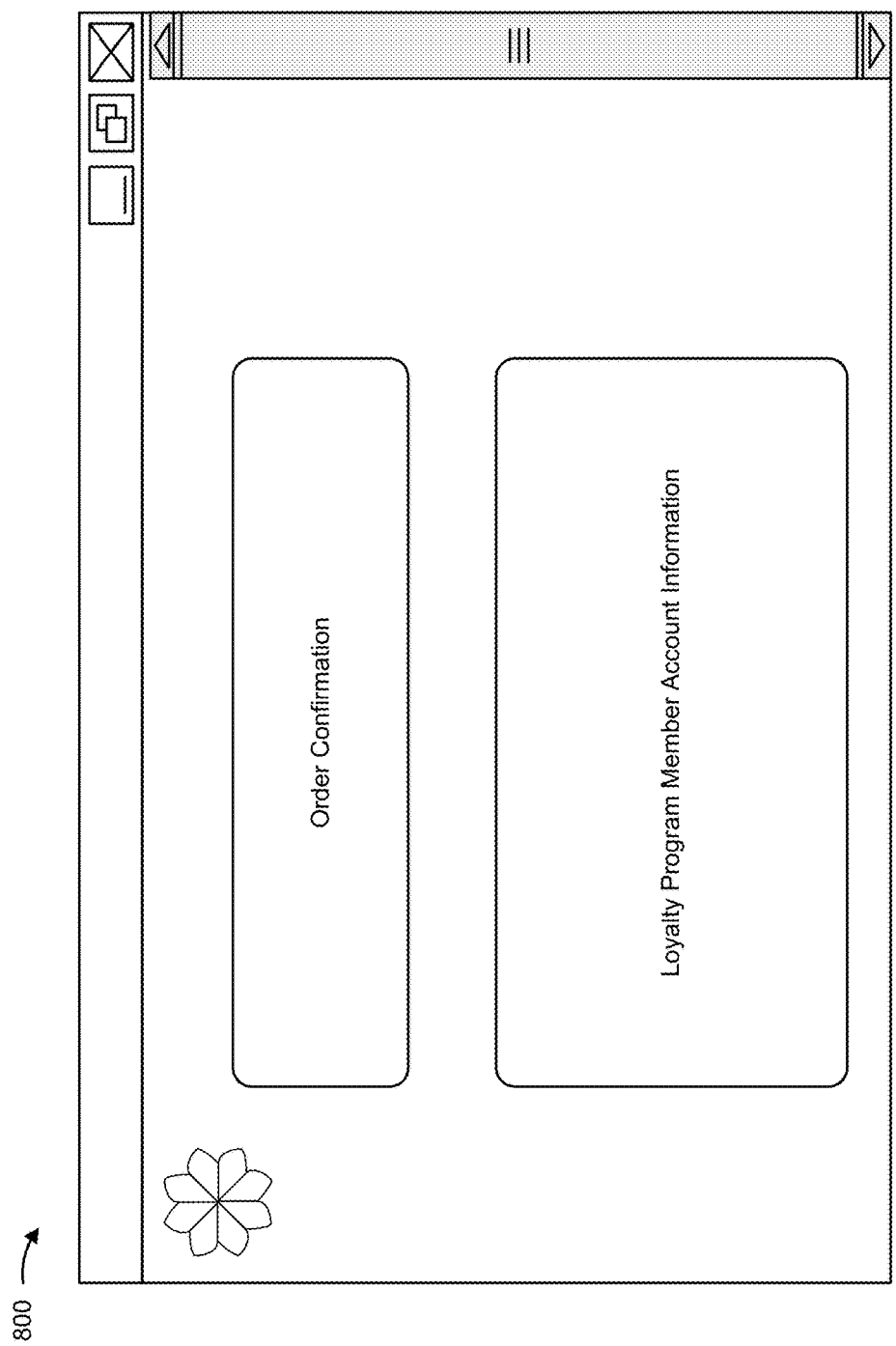

Once the loyalty program member pays for the current purchase, POS terminal 242 may provide an order confirmation page, as shown in FIG. 8G. The order confirmation page includes an option to receive the order confirmation for the current purchase (e.g., a printed receipt, an e-mail receipt, a text receipt, etc.), and an option to access the user account of the loyalty program member (e.g., to access a page similar to the user account page shown in FIG. 6C).

While not specifically described with regard to the above-identified example implementation 800, loyalty server 210 may control the loyalty program information and may interact with and/or act through POS terminal 242 to provide the conversion rate information, to process the use of loyalty points, and/or to process the purchase of additional loyalty points.

As indicated above, FIGS. 8A-8G are provided merely as an example. Other examples are possible and may differ from what was described with regard to FIGS. 8A-8G.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, or the like), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory storing instructions; and
one or more processors to execute the instructions to:
use an automated method to determine a dynamic conversion rate associated with a loyalty program offered by a merchant,
the dynamic conversion rate specifying a monetary value allotted to a loyalty point in the loyalty program,
the dynamic conversion rate changing over time,
the dynamic conversion rate being associated with a first user, and
the dynamic conversion rate being determined without user input;
receive an instruction to lock the dynamic conversion rate for a period of time;
lock the dynamic conversion rate to a locked conversion rate for the period of time based on the instruction;
use the locked conversion rate to apply a discount to a first purchase during the period of time,
the locked conversion rate at a time of the first purchase being different from the dynamic conversion rate offered by the loyalty program at a time of the first purchase;
determine, based on a first user input associated with the first user, that the locked conversion rate is to be shared with a second user;
cause execution of an application, of a plurality of applications, based on the first user input;
receive, based on the execution of the application, data identifying the second user;
store, based on determining that the locked conversion rate is to be shared with the second user and the data identifying the second user, data associating the locked conversation rate in user account information associated with the second user; and
apply, based on the data associating the locked conversion rate in the user account information associated with the second user, the locked conversion rate to a second purchase associated with the second user,
the locked conversion rate at a time of the second purchase being different from the dynamic conversion rate offered by the loyalty program at the time of the second purchase.

2. The device of claim 1, where the loyalty program includes a plurality of loyalty tiers,
where the one or more processors, when determining the dynamic conversion rate, are to:
determine, for each of the plurality of loyalty tiers, a respective one of a plurality of conversion rates,
the plurality of conversion rates including the dynamic conversion rate.

3. The device of claim 2, where the one or more processors are further to:
assign a loyalty program member, of a plurality of loyalty program members associated with the loyalty program, to one of the plurality of loyalty tiers based on a total quantity of loyalty points associated with the loyalty program member.

4. The device of claim 1, where the one or more processors are further to:
determine a schedule for changing the dynamic conversion rate; and
change the dynamic conversion rate according to the schedule.

5. The device of claim 1, where the one or more processors are further to:
provide an option to a loyalty program member, of a plurality of loyalty program members associated with the loyalty program, to purchase additional loyalty points for a fee; and
add the additional loyalty points to an account of the loyalty program member based on selection of the option and payment of the fee.

6. The device of claim 1, where the one or more processors, when using the locked conversion rate, are to:
determine a quantity of loyalty points, associated with a loyalty program member of a plurality of loyalty program members associated with the loyalty program, to apply to the first purchase;
calculate the discount based on the quantity of loyalty points and the locked conversion rate; and
apply the discount to a total purchase price associated with the first purchase.

7. The device of claim 1, where the one or more processors are further to:
determine one or more loyalty program parameters; and
determine the dynamic conversion rate based on determining the one or more loyalty program parameters.

8. A non-transitory computer-readable medium storing instructions, the instructions comprising:
a plurality of instructions that, when executed by one or more processors, cause the one or more processors to:
use an automated method to determine a dynamic conversion rate associated with a loyalty program offered by a merchant,
the dynamic conversion rate specifying a monetary value allotted to a loyalty point in the loyalty program,
the dynamic conversion rate changing over time,
the dynamic conversion rate being associated with a first user, and
the dynamic conversion rate being determined without user input;
receive an instruction to lock the dynamic conversion rate for a period of time;
lock the dynamic conversion rate to a locked conversion rate for the period of time based on the instruction;
use the locked conversion rate to apply a discount to a first purchase during the period of time,
the locked conversion rate at a time of the first purchase being different from the dynamic conversion rate offered by the loyalty program at a time of the first purchase;
determine, based on a first user input associated with the first user, that the locked conversion rate is to be shared with a second user;
cause execution of an application, of a plurality of applications, based on the first user input;
receive, based on the execution of the application, data identifying the second user;
store, based on determining that the locked conversion rate is to be shared with the second user and the data identifying the second user, data associating the locked conversation rate in user account information associated with the second user; and
apply, based on the data associating the locked conversion rate in the user account information associated with the second user, the locked conversion rate to a second purchase associated with the second user,
the locked conversion rate at a time of the second purchase being different from the dynamic conversion rate offered by the loyalty program at the time of the second purchase.

9. The non-transitory computer-readable medium of claim 8, where the plurality of instructions, when executed by the one or more processors, further cause the one or more processors to:
cause information regarding the locked conversion rate to be provided to the second user via e-mail, text, a social media website, or a website associated with the merchant.

10. The non-transitory computer-readable medium of claim 8, where the plurality of instructions, when executed by the one or more processors, further cause the one or more processors to:
permit the second user to use the locked conversion rate only before expiration of the period of time.

11. The non-transitory computer-readable medium of claim 8, where the plurality of instructions, when executed by the one or more processors, further cause the one or more processors to:
permit the second user to use the locked conversion rate before and after expiration of the period of time.

12. The non-transitory computer-readable medium of claim 8, where the plurality of instructions, when executed by the one or more processors, further cause the one or more processors to:
provide an option to lock the dynamic conversion rate during the period of time; and
where the plurality of instructions, that cause the one or more processors to lock the dynamic conversion rate to the locked conversion rate for the period of time, cause the one or more processors to:
lock the dynamic conversion rate to the locked conversion rate for the period of time based on receiving a selection of the option.

13. The non-transitory computer-readable medium of claim 8, where the plurality of instructions, when executed by the one or more processors, further cause the one or more processors to:
- award loyalty points to a loyalty program member, of a plurality of loyalty program members associated with the loyalty program, based on a quantity of loyalty points associated with the loyalty program member and expiration of a time period.

14. The non-transitory computer-readable medium of claim 8, where the plurality of instructions, when executed by the one or more processors, further cause the one or more processors to:
- identify a quantity of loyalty points that a loyalty program member may earn; and
- determine the dynamic conversion rate based on the quantity of loyalty points that the loyalty program member may earn.

15. A method, comprising:
- determining, by one or more processors of one or more devices, and using an automated method, a dynamic conversion rate associated with a loyalty program offered by a merchant,
    - the dynamic conversion rate specifying a monetary value allotted to a loyalty point in the loyalty program,
    - the dynamic conversion rate changing over time,
    - the dynamic conversion rate being associated with a first user, and
    - the dynamic conversion rate being determined without user input specifying the dynamic conversion rate;
- receiving, by the one or more processors, an instruction to lock the dynamic conversion rate for a period of time;
- locking, by the one or more processors, the dynamic conversion rate as a locked conversion rate for the period of time based on the instruction;
- permitting, by the one or more processors, the locked conversion rate to be used to apply a discount to a first purchase during the period of time,
    - the locked conversion rate at a time of the first purchase being different from the dynamic conversion rate offered by the loyalty program at a time of the first purchase;
- determining, by the one or more processors and based on a first user input associated with the first user, that the locked conversion rate is to be shared with a second user;
- causing, by the one or more processors, execution of an application, of a plurality of applications, based on the first user input;
- receive, by the one or more processors and based on the execution of the application, data identifying the second user;
- store, by the one or more processors and based on determining that the locked conversion rate is to be shared with the second user and the data identifying the second user, data associating the locked conversation rate in user account information associated with the second user; and
- applying, by the one or more processors and based on the data associating the locked conversion rate in the user account information associated with the second user, the locked conversion rate to a second purchase associated with the second user,
    - the locked conversion rate at a time of the second purchase being different from the dynamic conversion rate offered by the loyalty program at the time of the second purchase.

16. The method of claim 15, where the loyalty program includes a plurality of loyalty tiers,
- where determining the dynamic conversion rate includes:
    - determining, for each of the plurality of loyalty tiers, a respective one of a plurality of conversion rates,
        - the plurality of conversion rates including the dynamic conversion rate.

17. The method of claim 16, further comprising:
- assigning a loyalty program member, of a plurality of loyalty program members associated with the loyalty program, to one of the plurality of loyalty tiers based on a total quantity of loyalty points associated with the loyalty program member.

18. The method of claim 15, further comprising:
- providing an option to a loyalty program member, of a plurality of loyalty program members associated with the loyalty program, to purchase additional loyalty points for a fee; and
- adding the additional loyalty points to an account of the loyalty program member based on receiving selection of the option and payment of the fee.

19. The method of claim 15, where the period of time is a first period of time; and
- where the method further comprises:
    - providing an option to re-lock the dynamic conversion rate during a second period of time; and
    - re-locking the dynamic conversion rate as a re-locked conversion rate during the second period of time based on selection of the option,
        - the re-locked conversion rate being different than the locked conversion rate.

20. The method of claim 15, further comprising:
- determining a purchasing parameter; and
- determining the dynamic conversion rate based on the purchasing parameter.

* * * * *